March 30, 1965 SISTER MARIE VERONICA 3,175,306
MULTI-LEAF TEACHING AID FOR GLOBE INSTRUCTION
Filed Nov. 29, 1963
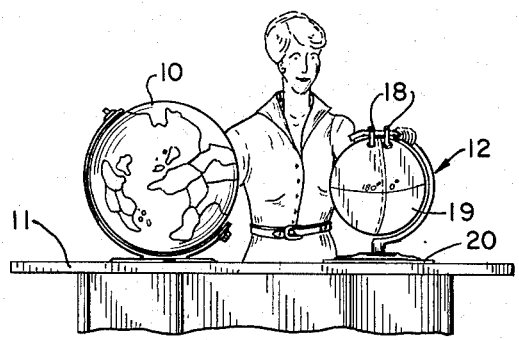
FIG. 1
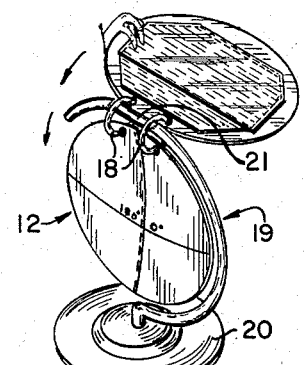
FIG. 2
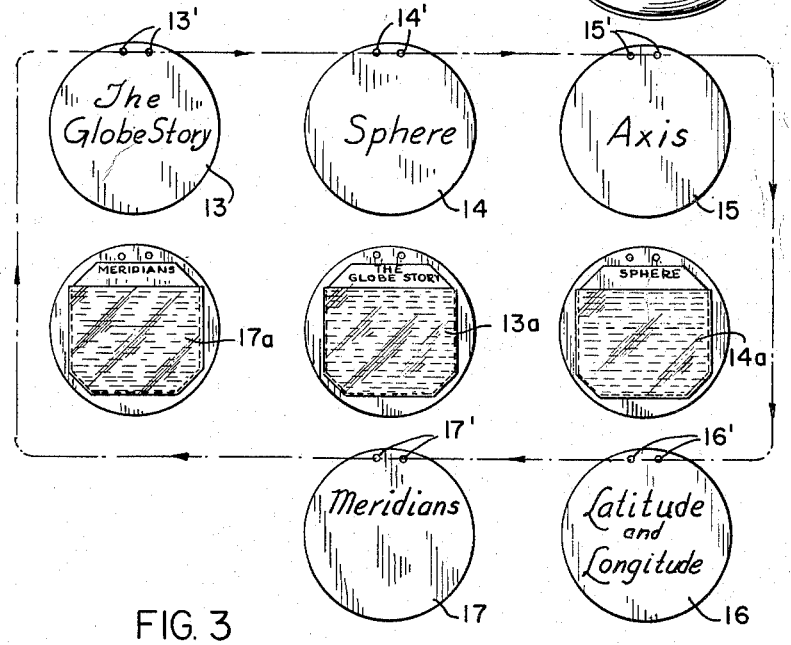
FIG. 3
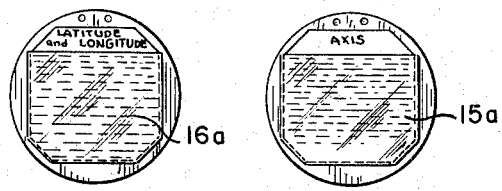
INVENTOR
SISTER MARIE VERONICA
BY
ATTORNEY 3,175,306
MULTI-LEAF TEACHING AID FOR
GLOBE INSTRUCTION
Sister Marie Veronica, Dubuque, Iowa, assignor to
Saint Clara College, Sinsinawa, Wis.
Filed Nov. 29, 1963, Ser. No. 327,021
1 Claim. (Cl. 35—40)

This invention relates to education including the obtaining and maintaining of the attention and interest of students, and teaching them that which will be of value and constitute a substantial part of their general education and training in a special subject and also in related subjects.

The invention relates to an instructive or educational device or instrumentality by which the attention and interest of students can be attracted and retained in subject matter selected to be taught and which will be of lasting value to the individual.

Educational studies have revealed that in order to teach, both the attention and interest of the students must be obtained and retained, as well as the fact that success in instruction requires the exercise of as many of the senses as possible, including the visual and the auditory. It likewise has been determined that instruction is more successful where means is provided for aid to the instructor in the information to be presented and the manner of such presentation, and many devices have been proposed for this purpose of which substantial criticisms have been made particularly as to the value thereof.

It is an object of the invention to improve the instruction or educational process by providing a primary visible representation of the subject plus a multiple visible representation, and at the same time provide a mechanical connection for the multiple visible representations and the substance of the subject matter relating to both as an aid to instruction by the visual and oral presentation thereof, as well as to provide a device of sufficient flexibility to allow a change in the subject matter and manner of its presentation.

Another object of the invention is to provide a unitary multi-leaf teaching aid of simple construction which can be easily operated to facilitate graphic presentation of material for acceptance by the student and to aid the instructor to obtain ultimate accelerated accomplishment in the field of education.

Another object of the invention is to provide a relatively simple teaching aid of a character suitable for use in the teaching of geography or the like subject having a number of related parts and by means of which the subject may be presented for visual study by the student during instruction period and by means of which the instructor may be assisted in the presentation of the subject orally, or on the other hand a student may use the teaching aid for the assistance he may obtain therefrom without the necessity of an instructor.

These and other objects and advantages of the invention will be apparent from the following description taken in connection with the accompanying drawing wherein:

FIG. 1 is a perspective illustrating a visible representation of the subject sought to be taught and an associated multi-leaf instructional device or teaching aid, both mounted on a common base;

FIG. 2, an enlarged perspective of the multiple-leaf presentation device and its support; and FIG. 3, an exploded view of the multiple leaves and the ring connector therefor.

Briefly stated the invention is directed toward teaching geography or about the globe on which we live and includes a primary visible representation of the subject to be taught, a standard globe with the map of the world thereon, in order that the student may see and examine it. A secondary device is provided which includes a series of relatively stiff cards or sheets, each having a configuration suggestive of the subject, and a graphic display on the front of each of the sheets to assist the student in visualizing or understanding the subject, while on the back of the sheets there is carried data pertaining to each sheet so that when a given sheet is displayed or presented at the front of the group of sheets data pertaining thereto will be exposed on the back of the rearmost sheet, thus assisting the instructor in the presentation of the subject. The sheets have pockets on the rear for the reception of the data sheets to provide flexibility so that the series may be increased for providing additional sheets carrying additional data for presentation with pertinent data for the instructor on the rearmost sheet. The relatively stiff sheets preferably are held in a group, for example, by a ring connector in a manner to maintain them in substantial alignment and permitting display one at a time, such ring connector holding means preferably being in the form of oversized rings which may be held in the hand or may be suspended from a support during the instruction period with such support carried on a base to provide unity between the primary and secondary displays of the related subject matter.

With continued reference to the drawing, a primary physical representation of the subject such as a globe 10 having a world map thereon is adapted to be mounted on a table, desk, or other support 11 beside which a secondary device 12 is adapted to be mounted and used for more detailed observation and presentation of the subject matter by particularly representing the subject matter for visual reception as well as carrying data for ready observation by the instructor to facilitate oral presentation of the proper subject matter to the students.

The secondary device consists of a series of relatively stiff cards or sheets 13–17 inclusive which may be of any desired number, all of a round configuration, suggestive of the shape of the earth, and the series of sheets carries appropriate headings of the phase of the subject under consideration. For example, the general title "Globe Story" and the subtitles "Sphere," "Axis," "Latitude and Longitude" and "Meridians." The sheets 13–17 are provided with ring openings 13', 14', 15', 16' and 17' for the reception of oversize rings 18 or other appropriate holding means. The use of two rings has been found desirable to maintain the sheets in substantial alignment and to provide adequate support although the number of rings is not critical.

On the front face of each of the sheets there is a graphic presentation of information relating to the subject under consideration. For example, on the first or primary sheet there appears the title "Globe Story" and on the succeeding sheets the representations are that the subject is a "Sphere," that has an "Axis," "Latitude and Longitude," and "Meridians."

The five sheets 13–17 are connected by the rings 18 and when the "Globe Story" sheet 13 is displayed and is visible on the front sheet of the device in order that the students may observe on the back of the rearmost sheet 14 will be the data 13a for relating to the "Globe Story" for ready sight and oral pronouncement by the instructor. In like manner when the rearmost sheet 14 is swung forwardly until it covers the first sheet 13 and displays "Sphere" on its front face the data 14a therefor will be on the back of the sheet 15 which was in front of sheet 14 and became the rearmost sheet. When the third sheet 15 is turned forward therefor to display "Axis" on its first face the data 15a therefor will be on the back of the next rearmost sheet 16. When the sheet 16 is turned to the forward position to display "Latitude and Longitude" on its front face the data 16a therefor will be on the back of the now rearmost sheet 17 relating to "Meridians" and when the sheet 17 is at the front the data 17a for "Meridians" will be on the back of the "Globe Story" sheet 13. Thus, as the graphic presentation of one sheet is before the students the data relative thereto is visible on the back of the rear sheet for facilitating instructions in teaching and if it is desired for the student to use the device without the teacher education is still facilitated. Consequently, it will be understood that as each sheet is presented and then is covered by the succeeding sheet of the stack always there is before the instructor data descriptive of the subject matter displayed in order to assist in the presentation.

It will be understood that additional sheets may be provided in which instance instead of a large truly circular ring a ring of any appropriate size and configuration may be employed. During the period of instruction the rings may be held by the instructor or if preferred they may be supported on an open-sided bracket 19 mounted on a base 20 and having a generally arcuate curvature corresponding to that of the sheets, such bracket having an upper relatively straight portion 21 adjacent the upper end thereof on which the rings are supported and from which the rings 18 are axially removable.

While the invention has been illustrated in connection with the teaching of geography involving the earth and the globe, it has obvious applications to the teaching of other subjects in which the shape or configuration of the sheets, the graphic material, and the data carried would be appropriate to the subject matter.

It will be obvious to one skilled in the art that various changes may be made in the invention without departing from the spirit and scope thereof and therefore the invention is not limited by that which is illustrated in the drawings and described in the specification, but only as indicated in the accompanying claim.

What is claimed is:

An aid for use in the teaching of geography or the like with a primary device having a supporting base and a globe structure representative of the world and rotatably mounted on said supporting base, said aid comprising a secondary device including a world instruction unit having a base, a support member having a portion of generally arcuately curved open-sided configuration extending in a substantially vertical plane above and fixedly secured to said base, said support member having an upper end with a horizontally extending portion adjacent the same, a plurality of spaced rings mounted in supported circling relation on said horizontally extending portion for axial removal therefrom, a series of relatively stiff cards of substantially the same generally circular form and size representative of the shape of the world-globe of the primary device suspendingly mounted on said rings for sliding movement along the major axis and in the plane of said rings, the corresponding sides of the forwardly facing suspended cards comprising display faces displaying various aspects of the subject matter to be taught, the circular cards having outlines corresponding to the curvature of the open-sided configuration of said support member thereby providing for free movable accommodation of the cards on said support member without interference therefrom, said suspendingly mounted cards being so disposed that only the forwardly disposed display face of the foremost card is visible from a position in front of said support member, each of said suspendingly mounted cards having mounted on the back thereof information pertaining to the subject matter being taught, the information on the rearmost card at any time containing information pertaining solely to the specific subject matter displayed on the front display face of the front card.

References Cited by the Examiner
UNITED STATES PATENTS

| | | | |
|---|---|---|---|
| 399,324 | 3/89 | Griffiths | 129—20 |
| 600,234 | 3/98 | Parr | 35—60 |
| 1,709,041 | 4/29 | Schutt | 40—128 |
| 1,711,070 | 4/29 | Suydam | 40—102 |
| 1,774,721 | 9/30 | Morris | 40—102 |
| 2,010,839 | 8/35 | Ayres | 40—102 |
| 2,389,511 | 11/45 | Horr | 40—102 X |
| 2,706,352 | 4/55 | Clark | 40—67 |
| 2,819,546 | 1/58 | Repholz | 40—102 |
| 3,091,482 | 5/63 | Cirigliano | 40—102 X |

JEROME SCHNALL, *Primary Examiner.*